Figure 3:
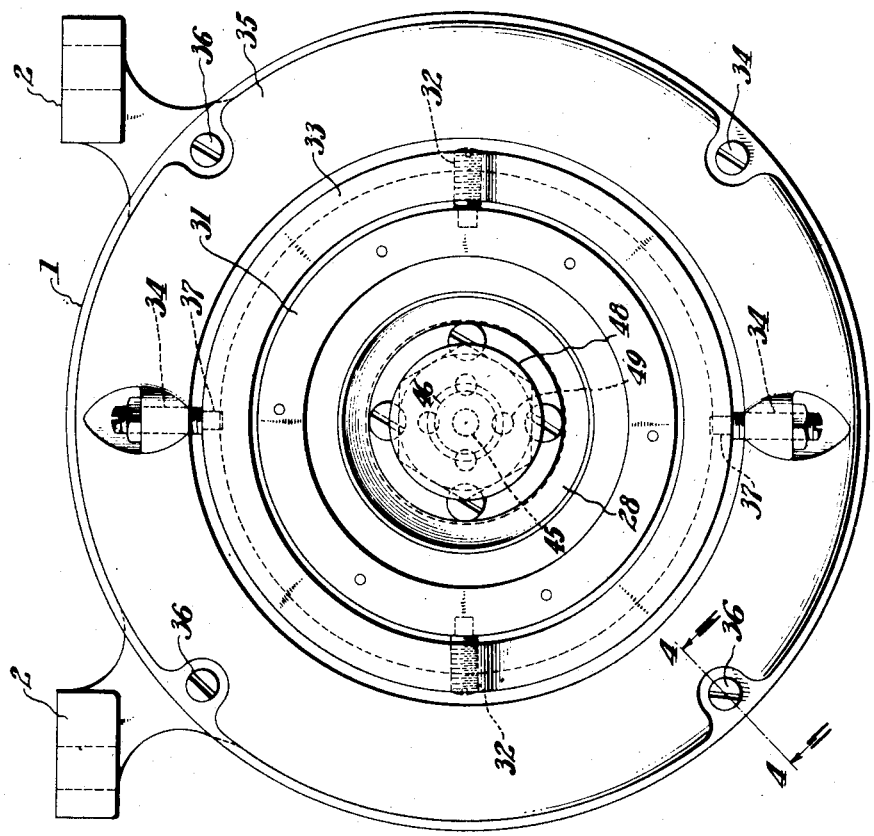

March 27, 1928.  
J. M. NAUL  
ELECTRIC POWER TRANSMITTER  
Filed Nov. 21, 1924  
1,663,607  
3 Sheets-Sheet 1
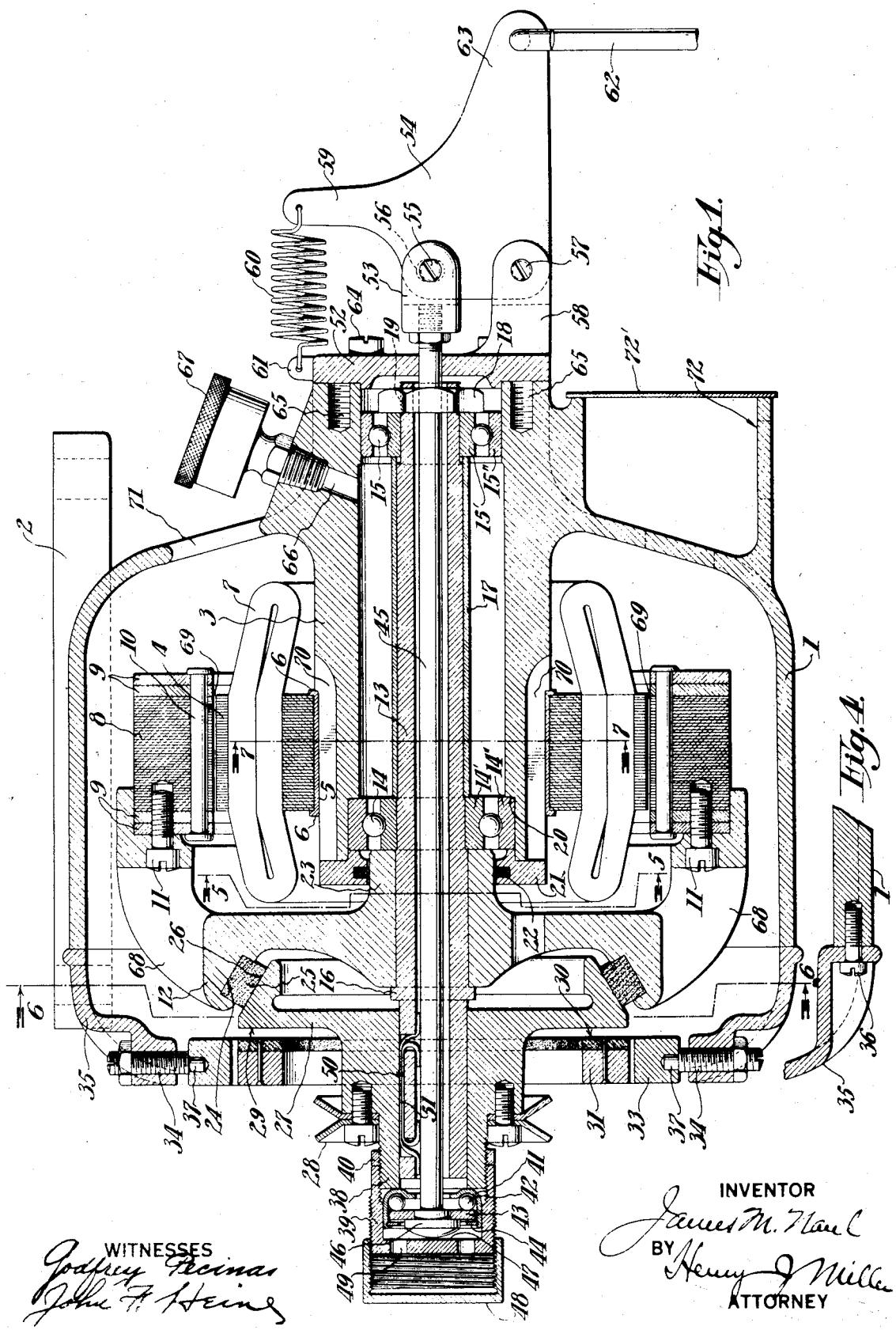

March 27, 1928.  
J. M. NAUL  
1,663,607  
ELECTRIC POWER TRANSMITTER  
Filed Nov. 21, 1924  
3 Sheets-Sheet 2

INVENTOR  
James M. Naul  
BY  
Henry J. Miller  
ATTORNEY

WITNESSES

March 27, 1928.

J. M. NAUL 1,663,607

ELECTRIC POWER TRANSMITTER

Filed Nov. 21, 1924

3 Sheets-Sheet 3

Patented Mar. 27, 1928.

1,663,607

UNITED STATES PATENT OFFICE.

JAMES M. NAUL, OF PLAINFIELD, NEW JERSEY, ASSIGNOR TO THE SINGER MANUFACTURING COMPANY, OF ELIZABETH, NEW JERSEY, A CORPORATION OF NEW JERSEY.

ELECTRIC POWER TRANSMITTER.

Application filed November 21, 1924. Serial No. 751,299.

This invention relates to electric power-transmitters of the type used in the individual drive and control of small machines such as sewing machines.

In some factories where sewing machines are used, it is customary to arranged the machines in rows on long tables known as power-tables. Such tables have a motor-driven line-shaft running lengthwise thereof and carrying driving pulleys which are belted to treadle-controlled clutches known as underdrivers or power-transmitters; the driven elements of such transmitters being belted to the respective sewing machines. In other installations the line shaft runs through the series of power-transmitters and is directly connected to the driving element of each transmitter, thereby eliminating belt-losses between the line-shaft and the transmitter. The modern tendency, however, is toward the individual motor drive, the line shafting and its bearing losses being eliminated and an individual motor and transmitter unit or electric power-transmitter provided for each sewing machine.

Electric power-transmitters such as heretofore employed for this work have, however, commonly been constructed with a heavy fly-wheel to effect the desired quick pick-up of the driven machine when the clutch elements are engaged; a quick pick-up being an essential requirement of a modern transmitter. This heavy fly wheel or weighted member has been mounted on or keyed to the motor-shaft so that the power from the rotary motor element had to be transmitted to the fly-wheel and from the fly-wheel to the driven machine through a shaft and key connection. This adds to the size, weight and cost of manufacture of the transmitter.

I have combined in a compact arrangement, in an electric transmitter unit, a manually controlled friction clutch with an electric motor having its rotary element disposed externally of its stationary element, so that a quick pick-up may be secured, thereby meeting the requirements of the trade in this respect, without the use of an additional fly-wheel. By virtue of the present arrangement, the rotary element of the motor may itself be formed with a driving friction clutch-face against which a driven clutch-member carrying the belt-pulley is moved by a connection with the usual treadle-rod. Thus, there is no driving through keys or shafts; the belt-pulley being driven directly from the rotary element of the motor through the friction-clutch.

Figure 2:
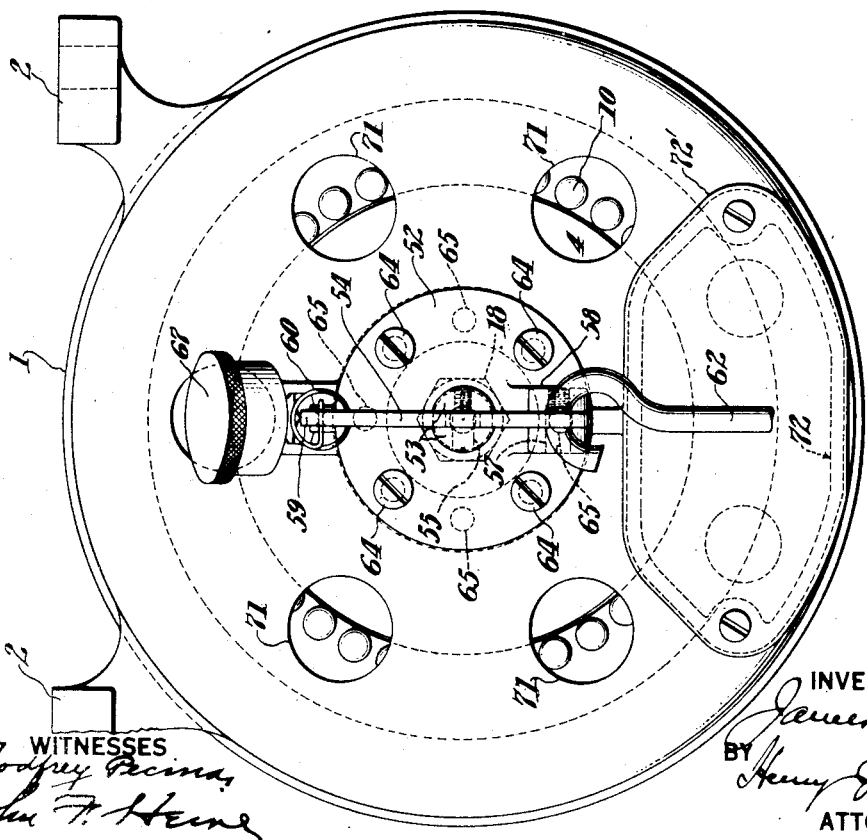
Figure 6:
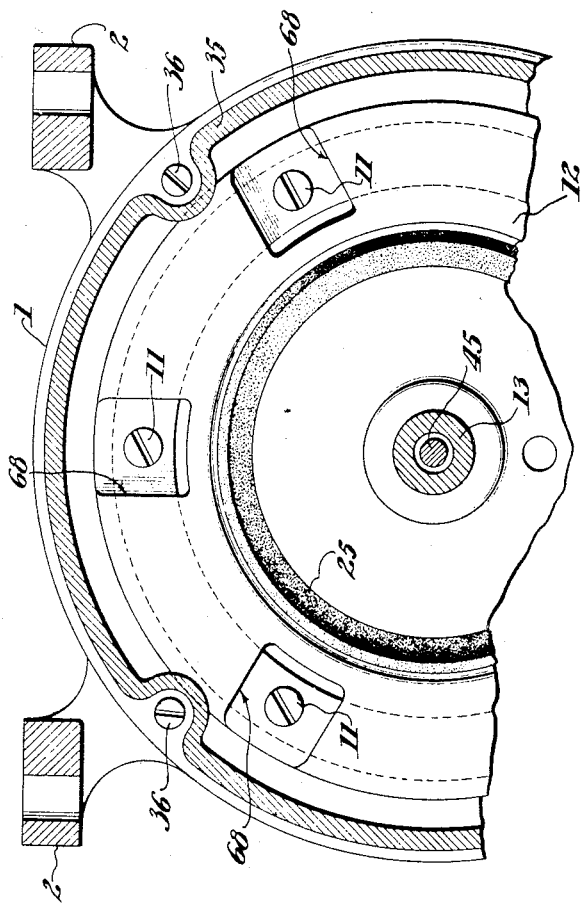
Figure 7:
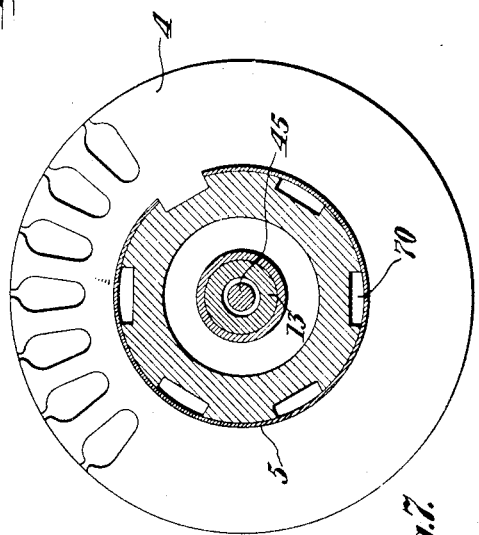
Figure 5:
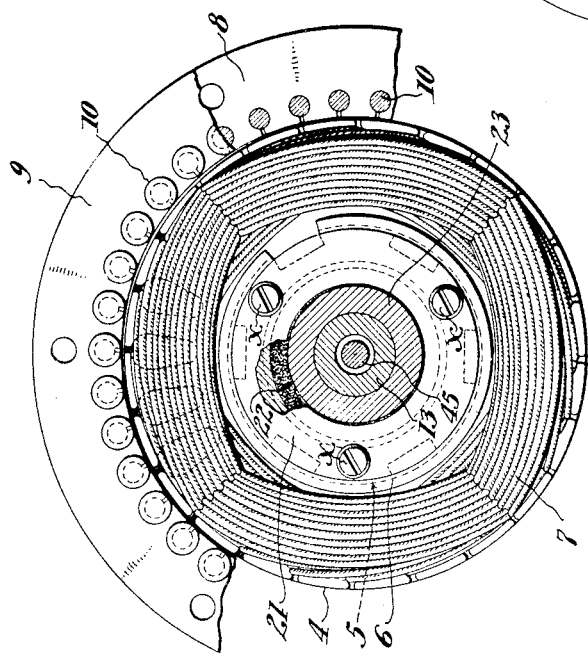

Referring to the accompanying drawings, Fig. 1 is a longitudinal vertical section through an electric power-transmitter embodying the invention. Figs. 2 and 3 are respectively right and left-end elevations of the transmitter shown in Fig. 1. Fig. 4 is a fragmentary section on the line 4, 4, Fig. 3. Fig. 5 is an internal sectional view on the line 5, 5, Fig. 1, showing the external rotary element detached from its supporting spider. Fig. 6 is a section on the line 6—6, Fig. 1, with the driven clutch-element removed, and Fig. 7 is a section on the line 7, 7, Fig. 1; the windings being removed.

In the preferred embodiment of the invention illustrated, the transmitter is formed with a hollow cylindrical frame 1 having the attaching feet 2 and the inwardly extending central tubular portion 3 on which is tightly fitted the stationary electro-magnetic element 4 of an electric motor. The element 4 may comprise a stack of externally toothed laminations which are assembled on the tube 5 having its ends spun over at 6, 6 and provided with a winding 7 of any desired type. In the particular motor illustrated the winding 7 is the usual four-pole three-phase winding.

The rotary electro-magnetic member of the motor is disposed externally of the stationary member 4 and is constituted by an ordinary ring type squirrel-cage rotor including the iron laminations 8, end-conductor rings 9 and conductor bars 10. The rotor-element 8 is secured by screws 11 to the spider 12 which is tightly fitted to and carried by the tubular shaft 13 journaled in the ball bearings 14, 15 within the tubular frame-portion 3. The shaft 13 is formed with an integral collar 16 and, in assembling the parts, the rotor-supporting spider 12 is pressed onto the shaft 13 in engagement with the collar 16. The ball-bearing 14 with its race rings 14', 14", the space tube 17 and ball-bearing 15 with its race rings 15', 15", are slipped on the shaft 13 in the order named and are all tightened in position by means of the nut 18 which is screwed onto the threaded extremity 19 of the shaft 13. The ball-bearing 14 constitutes the main working bearing and its outer race 14″ is clamped tightly against the shoulder 20 in the tubular frame-portion 3 by the retaining ring 21 which is secured to the inner end of the tubular frame-portion 3 by screws *x*, Fig. 5. The ring 21 is formed with a groove in which is fitted a felt wiping ring 22 engaging the hub 23 of the spider 12 to prevent escape of lubricating grease with which the tubular frame-member 3 is filled.

The support 12 or spider for the rotary motor-element 8 is grooved at 24 to receive the friction leather 25 constituting a driving friction clutch-face with which mates the clutch-face 26 of the driven clutch-member 27 fitted to slide and rotate upon and relative to the shaft 13, and having mounted on it the belt pulley 28.

The driven clutch-member 27 is preferably formed with a plane outer face 29 which is adapted to engage the leather face 30 of a brake-ring 31 which is carried by the diametrically opposed trunnion-screws 32 projecting inwardly from the intermediate ring 33 supported in turn by the diametrically opposed trunnion-screws 34 spaced 90° from the screws 32 and projecting inwardly from the end-bonnet 35 which is detachably secured to the frame 1 by means of screws 36. The cylindrical extremities 37 of the screws 34 are preferably formed eccentric to the threaded shanks of such screws, so that the brake-ring 31 may be adjusted axially of the shaft 13 to compensate for wear on the friction surfaces and maintain the desired amount of end-play of the driven clutch-member 27.

The driven clutch-member 27 has a hub-portion 38 which extends through the pulley 28 and is threaded externally to receive the cap 39 and lock ring 40. Disposed within the cap 39 is a ball thrust-bearing comprising the race 41 which bears against the end of the hub 38 of the driven clutch-member 27. Disposed within the race 41 are the balls 42 and the hardened washer 43 held in place by the expansible retaining ring 44. Passing through the hollow shaft 13 is the manually operated push-and-pull rod 45 the headed extremity 46 of which engages the washer 43 to exert pressure on the ball thrust-bearing 42 and shift the driven clutch-member 27 into engagement with the driving clutch-member 12. The cap 39 is adjusted lengthwise of the hub 38 to secure a slight working clearance between the rounded end of the head 46 and the inner end-wall 47 of said cap. A grease-cup 48 is screwed onto the cap 39 and forces lubricant to the ball thrust-bearing through the apertures 49 in the end-wall of such cap. The shaft 13 is also formed externally with a lubricant channel 50 extending lengthwise of the bearing surface between such shaft and the driven clutch-member 27. This channel is filled with a wick 51 the extremities of which pass through apertures to the hollow interior of such shaft which is in communication with the ball thrust-bearing chamber within the cap 39.

The clutch-operating rod 45 passes through an aperture in the cap-member 52 which closes the outer end of the tubular frame element 3 and has mounted on its outer end a yoke 53 the arms of which embrace the opposite faces of the lever-plate 54 and are connected by the screw-pin 55 which passes through the vertical slot 56 in the lever-plate 54. The lever-plate 54 is fulcrumed at 57 on the bifurcated bracket-arm 58 projecting from the cap-member 52 and has an upwardly extending arm 59 which is connected by the spring 60 to the ear 61 on the plate 52. A treadle rod 62 is connected to the arm 63 of the lever 54.

It will be noted that the cap 52 is secured to the frame 1 by four screws 64, Fig. 2, spaced 90° apart, and that the frame is tapped at points 65, spaced 45° from the positions of such screws shown in Fig. 2, to permit the cap 52 and parts carried thereby to be shifted 45° relative to the plane of the feet 2, thereby adapting the transmitter to be secured to the inclined trough-wall of a trough-table while maintaining vertically the plane of operation of the lever 54.

The interior of the tubular-frame element 3 is to be supplied with lubricating grease which may be introduced through the duct 66 by means of the grease-cup 67.

The motor is effectively ventilated by forming the spider with openings 68 which, by centrifugal action, draw air through the air gap 69 and through the ventilating grooves 70 cut longitudinally of the tubular frame-element 3. The frame 1 is provided at one end with ventilating openings 71. The openings between the driven clutch-member 27, the rings 31, 33 and end-bonnet 35 afford ventilating openings at the other end of the frame. The frame may be formed with a compartment 72 closed by a cover-plate 72′ for the connections between the current supply lines and the motor terminal wires.

A feature of importance is the quick pick-up or large fly-wheel effect secured without the use of an additional fly-wheel; the weight of the external rotating electro-magnetic member 8 acting in conjunction with the manually operated friction clutch to accelerate the driven machine from a standstill to full speed in a fraction of a second.

Another feature of importance is the marked compactness of the outfit which particularly fits it for use as an underdriver in the restricted space beneath a sewing machine power-table where it may be so stationed as not to inconvenience the operator.

The clutch elements are maintained in accurate and permanent alinement and the transmitter will operate without screeching and chattering.

Having thus set forth the nature of the invention, what I claim herein is—

1. A unitary electric under driver for machine tables comprising a hollow cylindrical frame having external attaching means and a tubular portion projecting into said frame from one end thereof, a brake carried at the other end of said frame, a stationary motor-member mounted on said internal tubular frame portion, a rotary motor member journaled within said frame coaxially with said internal tubular frame portion and having a driving clutch face, a driven clutch-member coaxial with said rotary motor member and cooperatively related with said brake, means for shifting said driven clutch member into engagement with said driving member, and a belt-pulley on said driven clutch-member.

2. A unitary electric under driver for machine tables comprising a hollow cylindrical frame having external attaching means, a hollow shaft within and coaxial with said frame, stationary and rotary motor elements within said frame coaxial with said shaft, said rotary motor element having a driving clutch face, a driven clutch member and belt pulley carried by said shaft at one end of said hollow frame, a stationary brake carried by said frame at the same end of the latter as the driven clutch member, a treadle controlled lever carried at the opposite end of said frame, and a push-and-pull rod passing through said hollow shaft and connected at its opposite ends to said driven clutch member and treadle controlled lever to transmit clutch and brake engaging movements in opposite directions to said driven clutch member.

3. A unitary electric power-transmitter comprising a hollow frame having external supporting means and an internal tubular portion, a stationary motor-element mounted within said hollow frame on said internal tubular portion, a rotary motor-element disposed within said hollow frame externally of said stationary motor-element, a shaft coaxial with said tubular frame portion and carrying said rotary motor-element, a combined driven member and belt-pulley journaled coaxially with said shaft, a friction clutch connection between said driven member and rotary motor-element and a brake carried by said frame for stopping said combined driven member and belt-pulley.

4. A unitary electric power-transmitter comprising a hollow frame having external supporting means and an inwardly projecting tubular portion, a stationary motor-element fixed to said tubular portion within said hollow frame, a rotary motor-element disposed within said hollow frame externally of said stationary motor-element, a shaft coaxial with said tubular portion, a spider coaxial with said shaft and carrying said rotary motor-element, said spider having a driving friction clutch-face, a driven clutch member and belt-pulley rotatably and slidably mounted coaxially with said shaft, and manually operated means for sliding said driven clutch-member.

5. An electric power-transmitter having, in combination, a hollow frame including a removable end-bonnet ring, an intermediate ring pivotally carried by said end-bonnet ring, a brake-ring pivotally carried by said intermediate ring, a shaft journaled in said frame transversely of the plane of said brake-ring, a driven clutch-element journaled on and movable endwise of said shaft and having a face opposed to said brake-ring and a hub-portion projecting through said brake-ring, a motor-driven live clutch-member within said frame, and manually operated means for sliding said driven clutch-member on said shaft.

6. An electric power-transmitter having, in combination, a motor-driven live clutch-element and shaft, a stationary self-aligning brake-ring spaced from said live clutch-element, a driven clutch-element slidably and rotatably journaled on said shaft and disposed between said brake-ring and live clutch-element, and means for shifting said driven clutch-element into engagement with either said live clutch-element or brake-ring.

7. An electric power-transmitter having, in combination, a motor-driven live clutch-element, a self-aligning stationary brake-ring substantially coaxial with and spaced from said live clutch-element, and a manually shiftable driven clutch-element interposed between said live clutch-element and brake-ring.

8. An electric power-transmitter having a hollow frame formed with an internal tubular portion, coacting electro-magnetic stationary and rotary motor elements carried by said tubular frame portion, an end-cap detachably closing the outer end of said tubular frame portion, a driven member, a friction clutch connection between the rotary motor element and said driven member, a clutch-operating rod disposed coaxially of said tubular frame portion and passing through said end-cap, and a treadle operated lever fulcrumed on said end-cap and connected to said rod.

9. An electric power-transmitter having a hollow frame formed with an internal tubular portion, coacting electro-magnetic stationary and rotary motor-elements carried by said tubular frame portion, an end-cap detachably closing the outer end of said tubular frame portion, a driven member, a friction clutch connection between the rotary motor element and said driven member, a clutch-operating rod disposed coaxially of said tubular frame portion and passing through said end-cap, a treadle-operated lever fulcrumed on said end-cap and connected to said rod, and means whereby a relative rotary shift may be effected between said motor-frame and end-cap.

10. A unitary electric underdriver for machine tables comprising, a hollow cylindrical frame having external attaching means and a tubular portion projecting into said frame from one end thereof, a frame-end member detachably secured to the other end of said frame, a brake carried by said frame-end member, a stationary motor-member mounted on said internal tubular frame portion, a rotary motor-member journaled within said frame coaxially with said internal tubular frame portion and having a driving clutch face, a driven clutch-member coaxial with said rotary motor member and cooperatively related with said brake, means for shifting said driven clutch member into engagement with said driving member, and a belt-pulley on said driven clutch-member.

In testimony whereof, I have signed my name to this specification.

JAMES M. NAUL.